United States Patent
Ryu

Patent Number: 6,131,044
Date of Patent: Oct. 10, 2000

[54] METHOD FOR INCREASING THE VOICE RECOGNITION RATE OF A VOICE RECOGNITION CALLING DEVICE

[75] Inventor: Yeoung-Moo Ryu, Kyongsangbuk-do, Rep. of Korea

[73] Assignee: Samsung Electronics Co., Ltd., Rep. of Korea

[21] Appl. No.: 09/064,282

[22] Filed: Apr. 22, 1998

[30] Foreign Application Priority Data

Jun. 9, 1997 [KR] Rep. of Korea ............ 97-23552

[51] Int. Cl.⁷ ............................................. H04B 1/38
[52] U.S. Cl. ............ 455/563; 455/79; 379/106.09; 704/233; 704/275
[58] Field of Search .......... 455/79, 563; 704/226, 704/228, 233, 270, 275; 379/420, 67.1, 69, 70, 82, 88.01, 88.03, 106.09, 386

[56] References Cited

U.S. PATENT DOCUMENTS

| | | |
|---|---|---|
| 4,521,647 | 6/1985 | Olson et al. ............ 379/88.01 |
| 4,578,540 | 3/1986 | Borg et al. ............ 379/386 |
| 4,837,808 | 6/1989 | Immendorfer et al. ............ 704/275 |
| 5,111,501 | 5/1992 | Shimanuki . |
| 5,483,579 | 1/1996 | Stogel ............ 379/88.01 |
| 5,729,602 | 3/1998 | Sullivan et al. ............ 379/88.03 |

FOREIGN PATENT DOCUMENTS

| | | |
|---|---|---|
| 0259218 | 3/1988 | European Pat. Off. . |
| 04068950 | 4/1992 | Japan . |
| 2229607 | 9/1990 | United Kingdom . |
| 2260878 | 4/1993 | United Kingdom . |

*Primary Examiner*—Nay Maung
*Assistant Examiner*—Quochien B. Vuong
*Attorney, Agent, or Firm*—Dilworth & Barrese

[57] ABSTRACT

A method for increasing the voice recognition rate in a voice recognition calling device wherein the frequencies of a ring sound are separated from those of a voice bandwidth to enable the application of input voice from a combined voice and ring input to a voice recognition processor. In an alternative embodiment, the duration of the ring sound is shortened to increase the voice recognition rate of a voice recognition calling device.

6 Claims, 3 Drawing Sheets

METHOD FOR INCREASING THE VOICE RECOGNITION RATE OF A VOICE RECOGNITION CALLING DEVICE

BACKGROUND OF THE INVENTION

1. Field of the Invention

The present invention relates to a voice recognition calling device, and in particular, to a method for increasing the voice recognition rate during call initiation.

2. Description of the Related Art

In general, a calling device such as a hands-free telephone provides the function of recognizing voice received through a speaker, processing the voice, and outputting voice through the speaker. Therefore, the speaker phone includes a speaker and a microphone, a voice recognition processor for recognizing voice received through the microphone, and a speaker phone processor for outputting the voice received through the microphone to the speaker.

FIG. 1 is a block diagram of such a calling device, that is, a device for recognizing voice and enabling a call. This voice recognition calling device recognizes speech or voice, for example, "call", "open", "receive", and so on. The most common voice recognition calling device is a hands-free speaker phone. Another example of a voice recognition calling device is an automatic answering telephone.

A voice recognition calling device receives rings from a switch as follows. First, when rings are transmitted from the switch, the voice recognition calling device generates rings as long as the rings are received. Here, when a user inputs a voice command such as "call", "open", or "receive" in voice, the voice recognition calling device recognizes the voice and switches to a speaker phone mode. Thus, the user can talk over the speaker phone.

When the user wants to talk over the speaker phone, they must input a voice command while the calling device is ringing. Thus, the ring sounds are mixed with the voice command. Generally, voice recognition calling devices of this type are unable to receive the voice command in the mixed ring and voice command. Since the frequency of a ring sound generated in the general voice recognition calling device as shown in FIG. 1 typically has dual frequency of 500 Hz and 1 KHz in the same range as that of voice, and a single-second ring-on follows a two-second ring-off in its ring cycle.

SUMMARY OF THE INVENTION

An object of the present invention is to provide a voice processing method which can increase the voice recognition rate in a voice recognition calling device to allow rings to be received through a speaker phone.

Another object of the present invention is to provide a voice processing method in a voice recognition calling device which can enable a call over a speaker phone upon the casual input of a voice command by the user.

To achieve these and other objects, there is provided a voice processing method for enabling communication over a speaker phone in a voice recognition calling device. According to one embodiment of the method, a decrease in the recognition rate of voice received for initiating a call over a speaker phone is prevented by separating the frequency of a ring sound from that of the voice bandwidth.

In another exemplary embodiment, the recognition rate of voice received for initializing a call over a speaker phone is increased by shortening the duration of the ring sound.

BRIEF DESCRIPTION OF THE DRAWINGS

The above objects and advantage of the present invention will become more apparent by describing in detail preferred embodiments thereof with reference to the attached drawings in which.

DETAILED DESCRIPTION OF PREFERRED EMBODIMENTS

Preferred embodiments of the present invention will be described in detail with reference to the attached drawings. Detailed description of related know function and structure will be avoided when it is deemed to obscure the subject matter of the present invention. Further, terms used in the description are defined in consideration of functions of the present invention. Thus, it should be contemplated that because the terms can be varied according to a user, a chip designer, or customary uses, the definition should be based on the overall disclosure of the present invention.

Figure 2A:
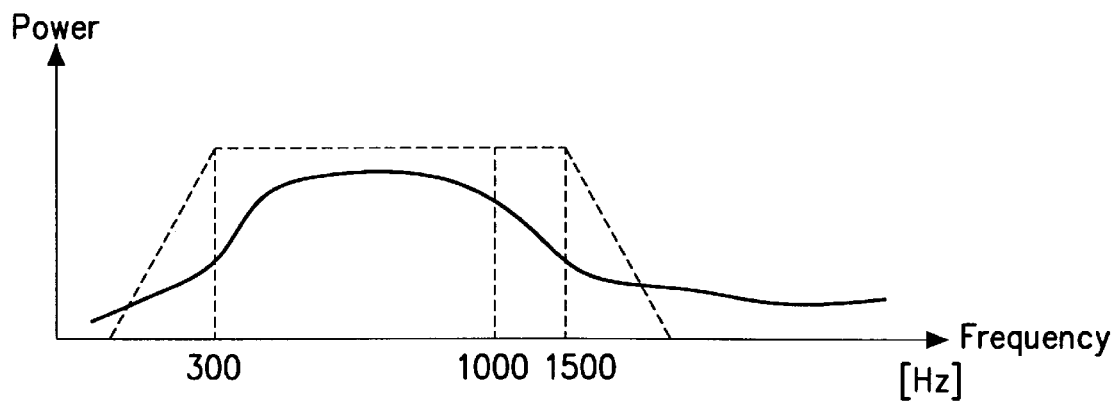
FIGS. 2A and 2B are graphical representations for describing the input voice processing method for a call over a speaker phone according to an embodiment of the present invention.
Figure 2B:
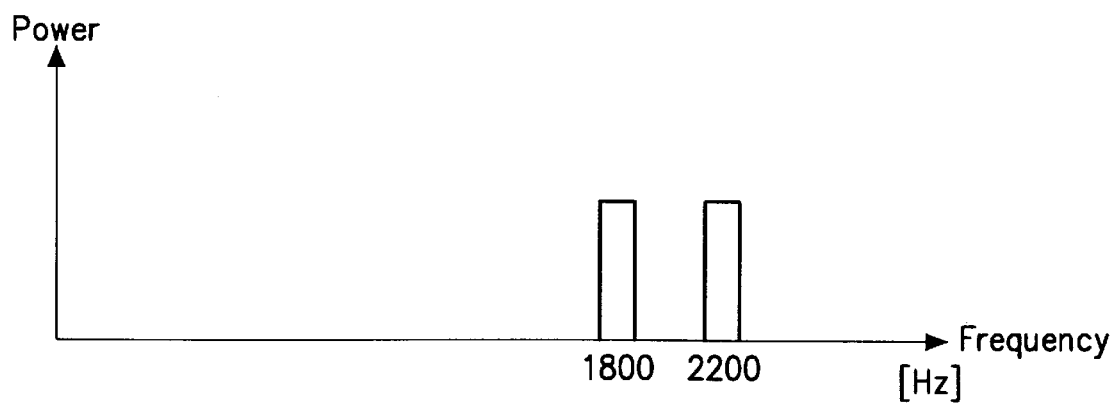

FIGS. 2A and 2B are graphical representations of power vs. frequency for describing an input voice processing method for call initiation of a call over a speaker phone according to an embodiment of the present invention.

Figure 1:
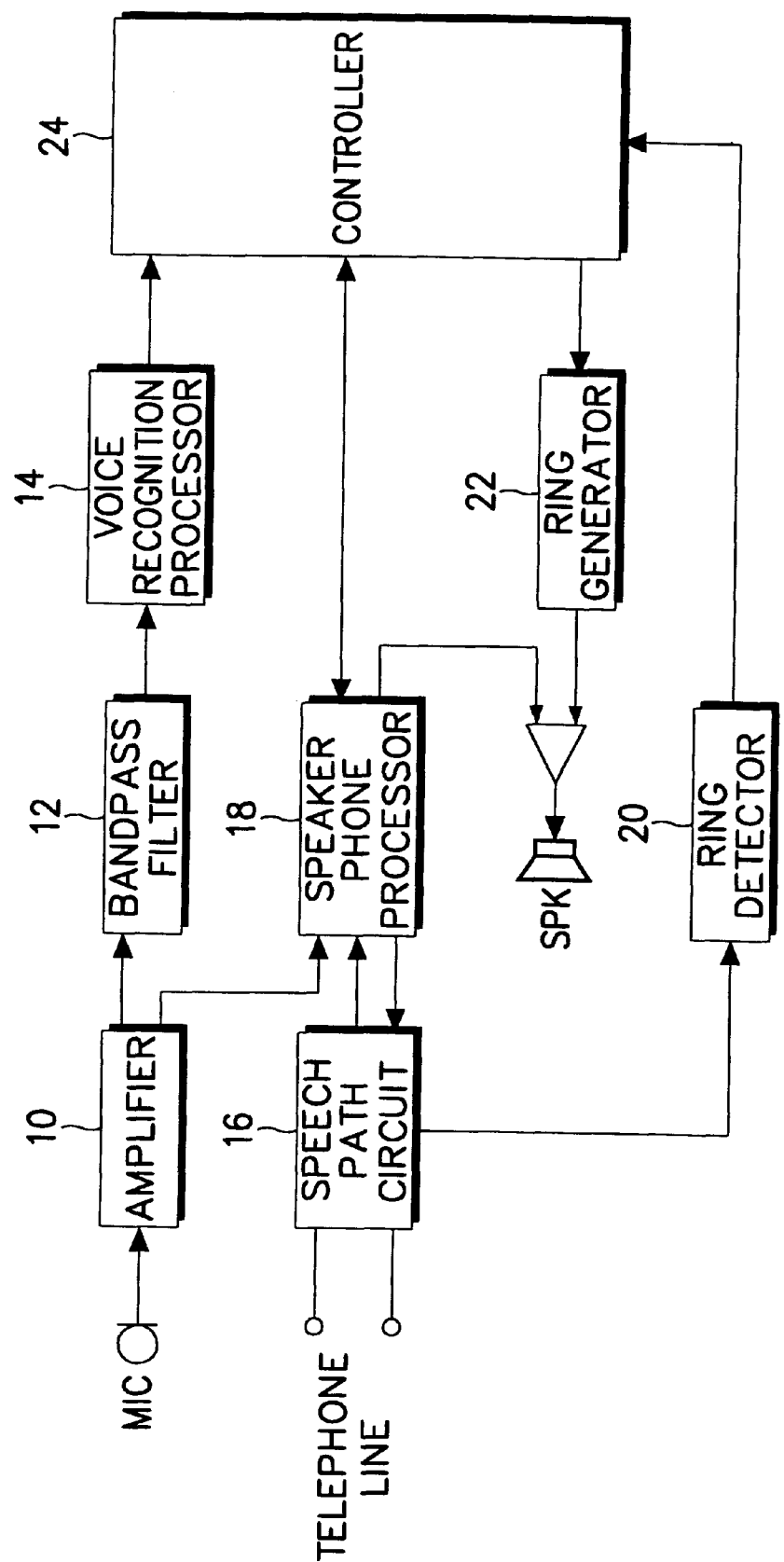
FIG. 1 is a block diagram of a voice recognition calling device to which the present invention is applied.

Referring to FIGS. 1 and 2A and 2B, rings are generated by a ring generator 22, and transmitted to a voice recognition processor 14 via a speaker SPK and a microphone MIC for a speaker phone. In the method, the bandwidth of voice filtered by a bandpass filter 12 is improved to minimize the amount of voice introduced into a ring sound. That is, the bandwidth of voice filtered by the bandpass filter 12 is set to 300 Hz to 1.5 kHz. The blocking frequency of the bandwidth of voice filtered by the conventional bandpass filter 12 was 3.4 kHz. From frequency analyses of actual voice, it is noted that most voice energy is distributed in a range of 400–900 Hz as shown in FIG. 2A. Therefore, at approximately 1.5 kHz or higher, frequency components of the voice frequency bandwidth may be blocked without any adverse result.

In addition, the method provides for differentiating the frequency of a ring sound from that of the voice bandwidth, to block the ring sound reapplied via the microphone MIC from being introduced into the voice recognition processor 14. The frequency of the ring sound is made different from that of the voice bandwidth, by using a dual frequency of 1.8 kHz and 2.2 kHz. This dual frequency exceeds the bandwidth range of the blocking frequency (i.e., 1.5 kHz) of bandpass filter 12.

As a result of the frequency differentiation between the ring sound and the voice bandwidth, even when the ring sound is reapplied to the microphone MIC from the speaker SPK, the ring sound is output only through the speaker phone processor 18 and the speaker SPK without being applied to the voice recognition processor 14. Thus, even with the concurrent input of voice for a call over a speaker phone and a ring sound via the microphone MIC, only the voice for a speaker phone call is applied to the voice recognition processor 14. Therefore, controller 24 receives only the voice processed in the voice recognition processor 14, confirms the voice, and controls the speaker phone processor 18 to transmit a call to the speaker SPK thereby enabling a call through the speaker phone.

Figure 3A:
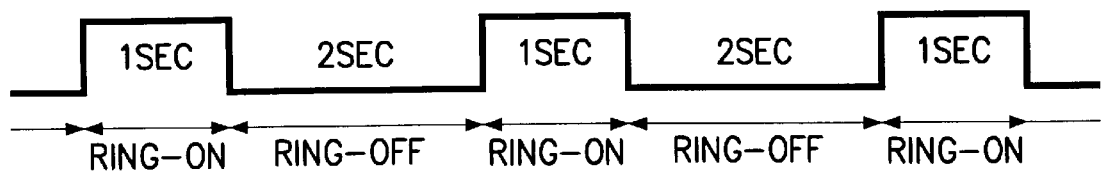
FIGS. 3A and 3B are timing diagrams for describing the input voice processing method for a call over a speaker phone according to another embodiment of the present invention.
Figure 3B:
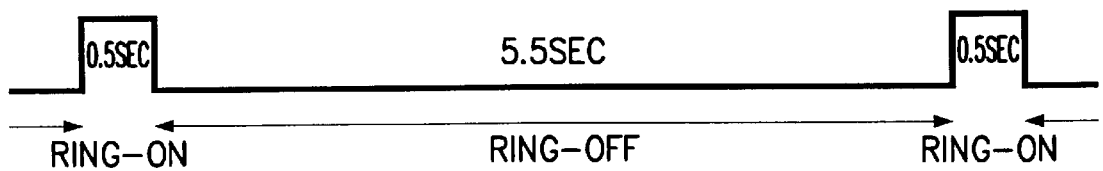

FIGS. 3A and 3B are timing diagrams for describing an input voice processing method during call initiation for a call over a speaker phone according to another embodiment of the present invention.

According to this embodiment, even with a single-second ring-on and two-second ring-off ring cycle (FIG. 3A), introduced from a switch, controller 24 applies a 0.5-second ring-on and 5.5-second ring-off ring cycle as shown in FIG. 3B. By generating a ring sound shorter than that output from the switch, (i.e., shortening the ring-on cycle), an area having a mixture of input voice and a ring, and which requires blocking recognition of the input voice can be removed. Therefore, a ring-induced decrease in voice recognition rate can be prevented.

As described above, the present invention advantageously prevents the decrease of the input voice recognition rate for a call over a speaker phone by separating the frequency of a ring sound from that of voice bandwidth, or shortening the ring sound.

While the present invention has been described with the specific embodiments, it is clearly understood that many variations can be made by anyone skilled in the art within the scope and spirit of the present invention. Thus, the appropriate scope hereof is deemed to be in accordance with the claims as set forth below.

What is claimed is:

1. A method for processing voice commands to receive a call over a voice recognition calling device having a speakerphone, comprising the steps of:
    a) differentiating a frequency bandwidth of a ring sound generated by the calling device from a frequency bandwidth of the voice commands using a bandpass filter, wherein said frequency bandwidth of the ring sound is higher than the frequency bandwidth of the voice command; and
    b) receiving the ring through the speakerphone upon input of voice commands for receiving the call over the speakerphone.

2. The method according to claim 1, wherein the frequency bandwidth of the ring, sound is 1.8–2.2 kHz.

3. The method according to claim 1, wherein frequency bandwidth of the voice input in 300 Hz–1.5 kHz.

4. The method according to claim 1, further comprising the step of generating a ring having a 0.5 second ring-on and a 5.5 second ring-off cycle, said step of generating being performed prior to said step of receiving.

5. A method for processing voice commands in a voice recognition calling device comprising the steps of:
    a) setting an input voice command frequency bandwidth of 300 Hz–1.5 kHz;
    b) setting a ring frequency bandwidth different than said voice command bandwidth, said ring frequency bandwidth having a lower frequency limit greater than 1.5 kHz; and
    c) receiving a ring sound through a speaker of the voice recognition calling device upon input of a voice command initiating an incoming telephone call.

6. The method according to claim 5, further comprising the step of generating a ring having a 0.5 second ring-on and a 5.5 second ring-off cycle when a ring signal is received by the voice recognition device.

* * * * *